UNITED STATES PATENT OFFICE.

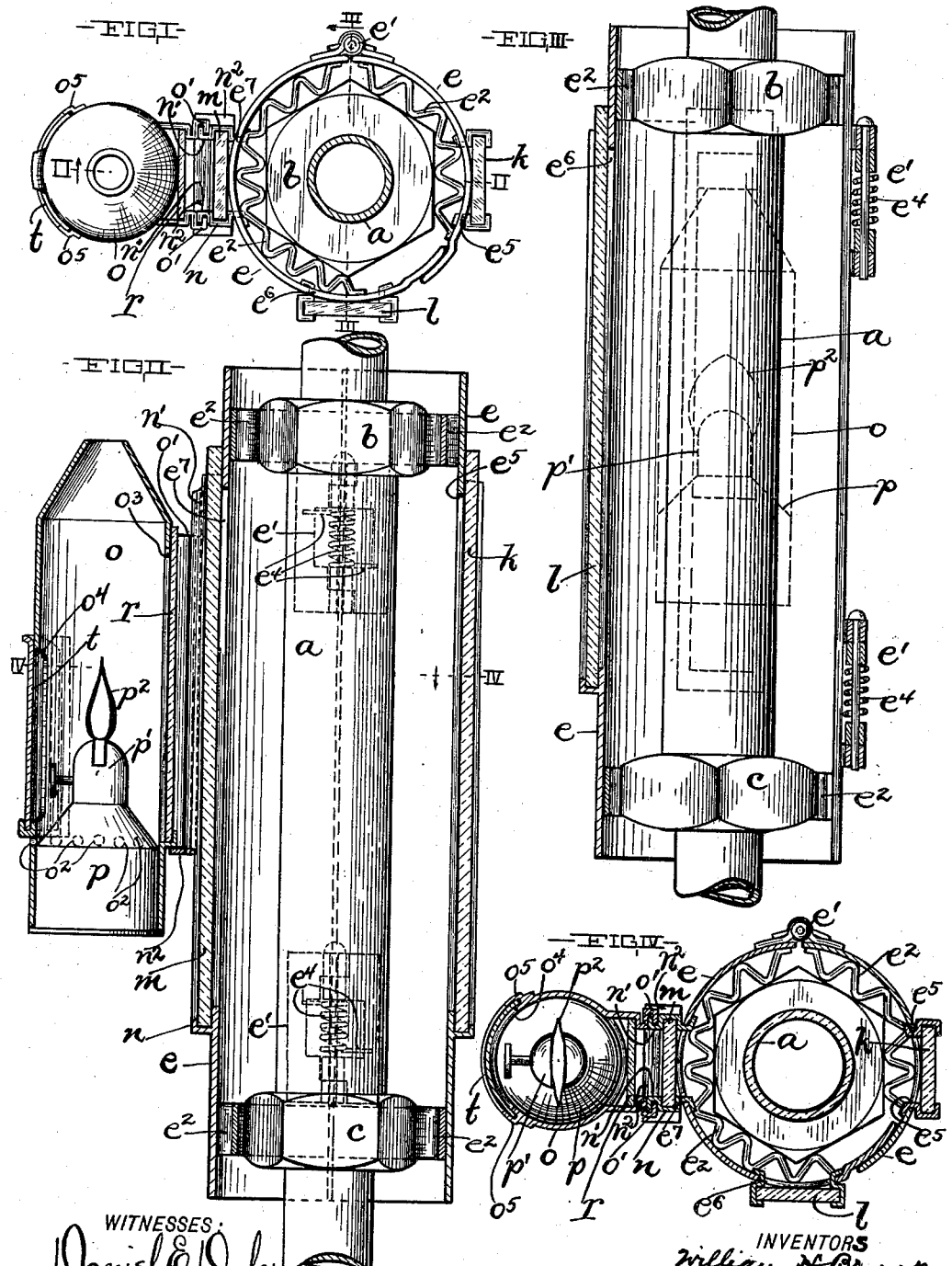

WILLIAM H. BROOKS AND HERMAN C. FISCHER, OF CLEVELAND, OHIO.

GUARD FOR WATER-GAGES.

SPECIFICATION forming part of Letters Patent No. 668,325, dated February 19, 1901.

Application filed August 6, 1900. Serial No. 25,970. (No model.)

*To all whom it may concern:*

Be it known that we, WILLIAM H. BROOKS and HERMAN C. FISCHER, residents of Cleveland, in the county of Cuyahoga and State of Ohio, have invented certain new and useful Improvements in Guards for Water-Gages; and we do hereby declare the following to be a full, clear, and exact description of the invention, such as will enable others skilled in the art to which it pertains to make and use the same.

Our invention relates to improvements in guards for water-gages that are employed in connection with and indicate the depth of water in a steam-boiler and that are more especially serviceable upon a locomotive.

The primary object of this invention is to provide a gage of the character indicated that has not only the safety and reliability required to positively avoid injury to the engineer or fireman having charge of the locomotive upon which the gage is used resulting from flying pieces of glass or escaping steam or hot water upon a breakage of the glass of the gage, but that comprises a guard having three windows arranged at suitable intervals around the guard, one facing the engineer's position, another facing the fireman's position, and another facing the burner of a lamp with which the guard is provided, so that the glass of the gage and its contents are capable of being adequately illuminated at all times, in the night-time as well as in the day-time, and the engineer and the fireman are able to observe the height of the water in the gage with facility at all times.

With this object in view and to the end of realizing other advantages hereinafter appearing the invention consists in certain features of construction and combinations of parts hereinafter described, and pointed out in the claims.

In the accompanying drawings, Figure I is a top plan of the gage provided with a lamp-bearing guard embodying our invention. Fig. II is a side elevation, largely in central vertical section, on line II II, Fig. I. Fig. III is a side elevation, largely in central vertical section, on line III III, Fig. I, looking toward the lamp of the guard. Fig. IV is a top plan, in horizontal section, on line IV IV, Fig. II.

Referring to the drawings, $a$ designates the glass tube or glass of the gage, which glass is provided with an upper head $b$ and a lower head $c$, to which are connected different pipes, respectively, leading from the water-space and steam-space, respectively, of the boiler (not shown) and communicating in the usual manner with the lower end and upper end, respectively, of the chamber of the glass $a$.

The guard for the glass $a$ consists of a case or sheath composed in the main of sheet metal and surrounding the gage and extending from top to bottom of the gage and preferably a short distance above and below the gage. The said case is open at its upper and lower ends and is larger in end elevation or transverse section than the gage, so as to form an annular space within the guard around the gage, which space accommodates the escape of the hot water and steam from the lower end and upper end, respectively, of the guard when the glass of the gage becomes broken. The said case consists, preferably, of two sections $e$ and $e$, embracing the gage and hinged together vertically and longitudinally of the gage at one side of the gage, so as to render the said sections $e$ and $e$ capable of being swung in a horizontal plane upon the said hinge connection toward and from each other. One of the sections $e$ extends about two-thirds of the distance around the gage, and the other section $e$ extends from the said hinge connection somewhat more than the remaining one-third of the distance around the gage, as shown Figs. I and IV. Each section $e$ is provided upon its inner surface with two jaws $e^2$ and $e^2$, arranged adjacent to the upper head and lower head, respectively, of the gage and adapted to close against the adjacent gage-head in the closed position of the sections $e$. The hinge connection between the sections $e$ and $e$ is composed, preferably, of one or more suitably-applied spring-hinges $e'$, whose springs $e^4$ act to retain the said sections in their closed position. It will be observed, therefore, that the gage has its heads $b$ and $c$ clutched by and between the jaws $e^2$ of the sections $e$, and the springs $e^4$ act to maintain the said jaws in their operative position, and hence act to retain or hold the guard upon the gage.

The smaller of the two sections $e$ and $e$ when the gage is in use upon a locomotive faces the engineer's position and is provided with a slot $e^5$, that extends up and down or longitudinally of the said section and is closed by a sight-glass $k$, held in position in any approved manner. The glass $a$ of the gage is therefore visible to the engineer from the engineer's seat through the window-forming sight-glass $k$.

The larger of the two sections $e$ and $e$, that, as already indicated, extends about two-thirds of the distance around the gage, is provided with two slots $e^6$ and $e^7$, extending up and down or longitudinally of the said section. The slot $e^7$ is arranged directly opposite the slot $e^5$. The slot $e^6$ is arranged directly opposite the hinges $e'$ and centrally between the slots $e^5$ and $e^7$. The slot $e^6$ is covered by a sight-glass $l$, that is held in position in any approved manner. The glass $a$ of the gage is therefore visible to the fireman through the sight-glass $l$. The slot $e^7$ is covered by a sight-glass $m$, that transmits into the chamber or space surrounding the glass of the gage the rays of light radiating from the luminous body or member of a lamp with which the guard is provided, as will hereinafter more fully appear. It will be observed, therefore, that the larger of the two sections $e$ and $e$ of the guard has a window-forming sight-glass $l$, arranged directly opposite the hinges $e'$, and has a window-forming sight-glass $m$, arranged directly opposite the window-forming sight-glass $k$ of the companion section $e$. The sight-glass $m$ is arranged within a holder $n$, constructed in any approved manner and rigid with the connected guard-section $e$. The holder $n$ is provided with two slideways $n'$ and $n'$, arranged vertically and a suitable distance apart at the outer side of the sight-glass $m$.

Each slideway $n'$ is engaged by a vertically-arranged slide $o'$, formed upon or rigid with an upright tubular guard $o$, that surrounds the burner $p'$, with which the lamp $p$, that is suitably supported from the lower end of the said guard $o$, is provided. The guard $o$ prevents the flame from being extinguished by the wind. The guard $o$ at its lower end (see Fig. II) is provided with lateral perforations $o^2$, that form air-inlets for admitting air to the burner of the lamp. The guard $o$ (see Fig. II) is slotted vertically, as at $o^3$, directly opposite the sight-glass $m$, between the burner of the lamp and the said sight-glass, and the slot $o^3$ is closed by a suitably-applied sight-glass $r$, that is held in place in any approved manner. The window-forming sight-glass $r$ of the lamp-guard is arranged, therefore, directly opposite the sight-glass $m$, so that the rays of light from the burner's flame are transmitted to the chamber surrounding the glass $a$ of the gage.

The lamp-guard $o$, directly opposite its sight-glass $r$ and adjacent to the burner of the lamp, is provided with an aperture $o^4$, that is closed by a suitably-applied slide $t$, that extends between and engages two vertically-arranged slideways $o^5$ and $o^5$, formed upon the lamp-guard a suitable distance apart. The slide $t$ is shiftable upwardly, and the aperture $o^4$ when the slide is thus shifted affords access to the lamp-burner.

The lamp-guard $o$ has its upper portion conical and is open at the upper and smaller end of its said conical end portion. The internal surface of the lamp-guard $o$ and its slide $t$ are made, preferably, of sheet metal that is highly polished, and consequently the lamp-guard's inner surfaces, (including the inner surface of the slide $t$,) that are arranged opposite to the sight-glass $r$, form a reflector for reflecting rays of light through the sight-glasses $r$ and $m$ into the chamber or space surrounding the glass $a$ of the gage.

The guard-slides $o'$ and the connected lamp-guard are removable upwardly from the slideways $n'$, and a stop-forming shelf or flange or lug $n^2$ is formed upon the sight-glass holder $n$ and arranged as required to form a seat for the lamp and lamp-guard.

What we claim is—

1. A water-gage guard comprising a case composed of two sections having the dimensions required to render them capable, when they are close together, of surrounding the gage and forming a space between the exterior of the gage and the inner surfaces of the said sections, means for holding the case-sections upon the gage, a slot $e^5$ formed in and extending up and down one of the case-sections, a sight-glass $k$ covering the said slot, two slots $e^6$ and $e^7$ formed in and extending up and down the other case-section and the sight-glasses $l$ and $m$ covering the different last-mentioned slots, respectively, and a lamp removably attached to the last-mentioned case-section and arranged as required to illuminate the aforesaid space through one of the last-mentioned sight-glasses.

2. A water-gage guard comprising the following: a case composed of two sections $e$ and $e$ hinged together, as at $e'$, and having the dimensions required to render one of them capable of extending around the gage farther than the other, and, consequently, being the largest section; means for holding the case-sections upon the gage; the slot $e^5$ formed in the smaller case-section; the sight-glass $k$ covering the said slot; the slot $e^7$ formed in the larger case-section directly opposite the sight-glass of the smaller case-section; the slot $e^6$ formed in the larger case-section directly opposite the hinge connection between the two case-sections and the sight-glass $l$ for covering the last-mentioned slot, and a lamp attached to the larger case-section and arranged at the outer side of the first-mentioned slot of the said case-section, all arranged and operating substantially as shown, for the purpose specified.

3. A water-gage guard comprising the following: a case composed of two sections $e$ and $e$ hinged together, as at $e'$, and having the dimensions required to render one of them capable of extending around the gage farther than the other, and, consequently, being the larger section; means for holding the case-sections upon the gage; the slot $e^5$ formed in the smaller case-section; the sight-glass $k$ covering the said slot; the slot $e^7$ formed in the larger case-section directly opposite the sight-glass of the smaller case-section; a sight-glass $m$ covering the said slot; the slot $e^6$ formed in the larger case-section directly opposite the hinge connection between the two case-sections; the sight-glass $l$ covering the said last-mentioned slot; the holder $n$ supporting the sight-glass $m$ and provided with the vertically-arranged slideways $n'$ and $n'$; the lamp $p$ having the tubular guard $o$ provided with the slides $o'$ engaging the aforesaid slideways, and having a window facing the sight-glass $m$, all arranged and operating substantially as shown, for the purpose specified.

Signed by us at Cleveland, Ohio, this 26th day of July, 1900.

WILLIAM H. BROOKS.
HERMAN C. FISCHER.

Witnesses:
C. H. DORER,
A. H. PARRATT.